United States Patent [19]
Menzel

[11] 3,811,494
[45] May 21, 1974

[54] ICE CREAM MACHINE

[75] Inventor: Waldemar Menzel, Burghaig, Germany

[73] Assignee: Firma Ireks Arkady GmbH, Kulmbach, Germany

[22] Filed: Aug. 10, 1972

[21] Appl. No.: 279,381

[30] Foreign Application Priority Data
Aug. 10, 1971 Germany.......................... 2139917

[52] U.S. Cl.................... 165/65, 62/342, 62/348
[51] Int. Cl. .............................................. F25c 7/14
[58] Field of Search ............ 62/342, 348, 352, 353; 165/65

[56] References Cited
UNITED STATES PATENTS

| | | | |
|---|---|---|---|
| 3,665,722 | 5/1972 | Cornelius | 62/348 |
| 3,285,331 | 11/1966 | Bratland | 62/342 |
| 3,643,454 | 2/1922 | Turner | 62/348 |
| 3,402,562 | 9/1968 | Menzel | 62/342 |
| 3,369,376 | 2/1968 | Kious | 62/348 |
| 3,654,770 | 4/1972 | Clearman | 62/348 |
| 2,896,421 | 7/1959 | Rader | 62/348 |

Primary Examiner—William E. Wayner
Assistant Examiner—William E. Tapolcai, Jr.
Attorney, Agent, or Firm—Browdy and Neimark

[57] ABSTRACT

A device for the preparation and dispensing of soft ice cream, sherbert or flavored ice has two spacially separated and distinct chambers connected by means of elongated supply tubes, one chamber serving as a storage container in which refrigerating, heating, and sterilizing functions are carried out, and the other serving as a freezing and dispensing container.

4 Claims, 1 Drawing Figure

PATENTED MAY 21 1974 3,811,494
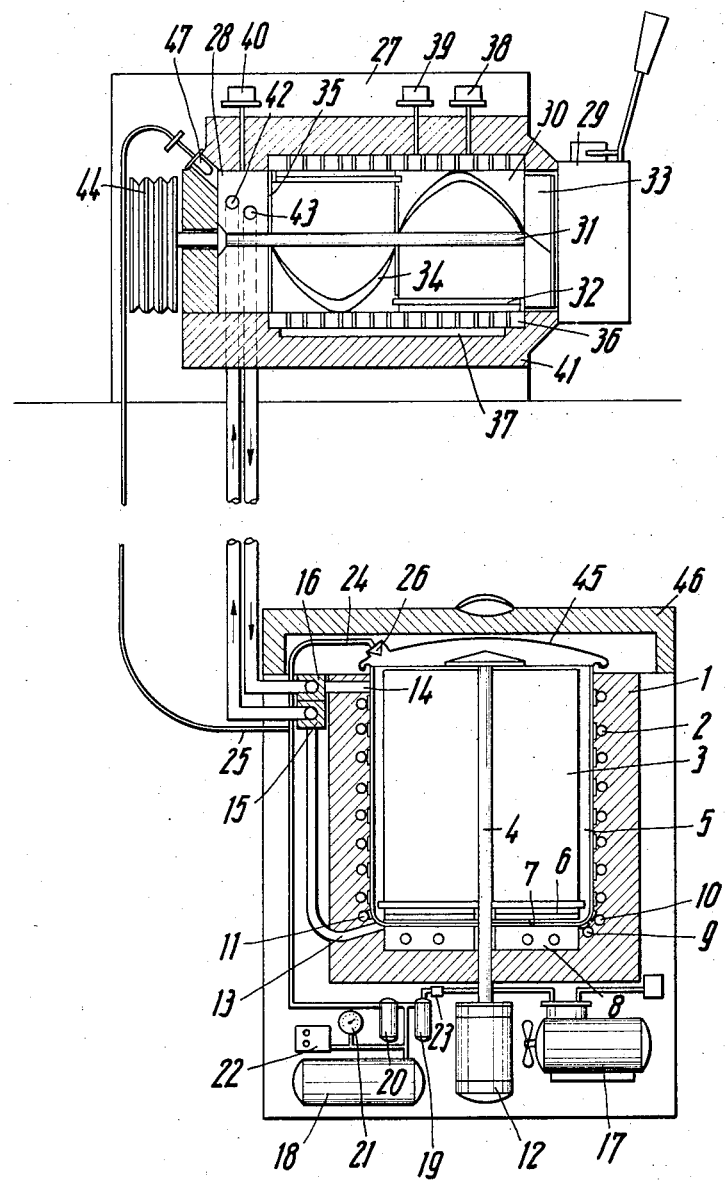

3,811,494

ICE CREAM MACHINE

FIELD OF INVENTION

The present invention relates to the preparation and dispensing of soft ice cream, sherbert or flavored ices, hereinafter soft ice, and, more particularly, to a device for the storage of soft ice in one location and the dispensing of such soft ice in another location.

BACKGROUND OF INVENTION

Devices for the preparation and dispensing in portions of soft ice, often referred to as "frozen custard" are well known, these devices often being found in specialty frozen custard stands as well as in restaurants. There are two general types of these machines, one of which combines in a single unit the soft ice preparing device, the freezing container, the storage container, the dispenser as well as the other auxiliary devices needed. This first type of device is understandably relatively bulky since all the necessary elements are contained within one unit.

To provide less bulky units, particularly for use as a table top unit, e.g. in restaurants, there has been suggested the provision of a freezing container which dispenses soft ice which can be arranged on a counter while the supply container can be located in a cold storage chamber or a central supply room together with other supplies. The spacial separation of the freezing and dispensing container from the supply container has the great advantage that the part of the device which dispenses the soft ice is small and convenient, the bulky supply container being out of the way. However, devices of this type also have substantial defects.

Thus, such devices having the freezer and dispenser separated from the storage container are interconnected by means of a single tube through which the soft ice mix and air, nitrogen or carbonic acid is forced from the storage container toward the freezing container to an extent which is proportional to the rate of removal of the portions of the soft ice from the dispenser. Thus, if no soft ice is dispensed from the freezing unit for a substantial period of time, the ice mix in the supply tube becomes warm leading to the propagation of bacteria. The inhibition of bacterial growth cannot even be effected if one uses carbonic acid as the gassing agent and, in fact, in many locales the use of sterilant gases are prohibited by law and in this regard the use of carbonic acid for the preparation of soft ice is unlawful in the Federal Republic of Germany.

SUMMARY OF INVENTION

It is, accordingly, an object of the present invention to obviate the defects of the prior art, such as indicated above.

It is another object of the present invention to provide for the improved dispensing of soft ice.

It is another object of the present invention to provide a soft ice machine which is not bulky in the locus of dispensing, and which is entirely sanitary and obviates the difficulties of bacterial growth.

It is another object of the present invention to provide a device for soft ice which has a storage container in one location and a freezing and dispensing container in another location spacially separated from the storage container, in which the device is provided with means insuring a bacteriologically satisfactory operation.

These and other objects and the nature and advantages of the instant invention will be more apparent from the following more detailed description. In general, however, the problems of the prior art are solved in accordance with the present invention by interconnecting the storage container and the freezing and dispensing container by means of a pair of tubes and by providing means for the constant or periodic repumping of the original soft ice mix, so that the mix in the tubes is never permitted to stand but is also maintained by recirculation at a temperature sufficiently low so that bacterial growth is inhibited.

In addition, the freezing container and/or the storage container are preferably equipped with a heating unit in order to provide pasteurization of the soft ice mix. It is also advantageous to provide at least one pump in the storage container for transporting or circulating the soft ice mix; and it is also advantageous to provide for the feeding of compressed gas to both the freezing container and the storage container.

According to the invention, significant advantages of the present device lie in the fact that the soft ice mix is continually or periodically repumped between the supply container and the freezing container whereby the deliberate quantity is purposefully steered or controlled in such a way that the ice mix is always brought toward the freezing unit faster than completely prepared and totally frozen soft ice is dispensed. This prevents the soft ice mix, which is located in the supply tube, from warming up which would inevitably lead to germ propagation. In addition, the improvement of the device utilizing a lead-in tube from the storage container to the freezing and dispensing container and a return tube in the opposite direction can also be used to pasteurize all of the soft ice mix located in the device, if the soft ice mix can be brought to pasteurization temperature by means of a heating unit located in the freezing container and/or the storage container, such pasteurization being carried out on the soft ice mix located in the tubes with certainty during the repumping. Also, the lead-in and return tubes can be thoroughly cleaned by merely pouring clean washing water into the storage container of the device which has been emptied of the soft ice mix, and by repumping and heating to a temperature suitable for the elimination of bacteria.

For a better understanding of the invention a possible embodiment thereof will now be described with reference to the attached drawing, it being understood that this embodiment is to be intended as merely exemplary and in no way limitative.

BRIEF DESCRIPTION OF DRAWING

The sole FIGURE shows an embodiment of a device in accordance with the present invention consisting of a storage container and a freezing container interconnected by means of lead-in and return tubes.

DETAILED DESCRIPTION OF EMBODIMENT

Referring to the bottom portion of the FIGURE, there is shown an insulated refrigerator 1 having a spiral coolant coil 2 wrapped thereabout. The interior of the refrigerator 1 constitutes a storage container 3 into which the soft ice mix is placed. Arranged horizontally within the storage container 3 is a stirring apparatus 4 having scraper blades 5 which, during operation, run along the sidewalls of the container 3. The stirring apparatus 4 also has rotating scraper blades 6 which, during operation, move along the floor of the supply container 3.

Beneath the floor of the container 3 is located a heating plate 8 having suitable heating rods or the like passing therethrough. A heating plate regulating thermostat 9 and a heating thermostat 10 are provided to adjust and control the heating temperature used, when desired, to pasteurize the soft ice mix or heat the cleaning water.

A cold thermostat 11 is also provided in order to insure that the soft ice mix is maintained at a constantly cool temperature during normal operation, by control of the coolant circulation through the coil 2. The stirring apparatus 4 is powered by a suitable drive motor 12, it being understood that the scraper blades 5 and 6 serve, among other things, to prevent scorching of the soft ice mix on the heating area 7 during heating of the ice mix to the pasteurizing temperature, which could lead to an impairment of the taste of the soft ice.

A lead-in tube 13 passes from the bottom of the storage container 3 and serves to remove the ice mix from the storage container 3 to the freezing and dispensing container. A return tube 14 opens into the upper part of the storage container 3 and extends from the freezing and dispensing container. Pumps 15 and 16 are connected, respectively, to the lead-in tube 13 and the return tube 14, for the repumping of the soft ice mix. These tubes are preferably insulated.

Located below the supply container 3 but spacially securely connected with it, is provided an air compressor 17 from which compressed air is pushed through a suitable check valve 23 and an air filter 19 into a compressed air supply container 18. A pressure gauge 21 and a suitable air pressure control device 22 are connected to the compressed air supply container 18 so that the air compressor 17 is disengaged when the compressed air pressure in the storage container 18 reaches a certain preselected value; conversely, as long as the pressure in the container 18 is below a minimum pressure, the motor of the compressor 17 continues to operate. An air tube 24 is provided between the compressed air supply container 18 and the top of the storage container 3. A sterile filter 20, preferably a bacteriologically effective filter, is located along the length of the air tube 24. The compressed air system maintains the soft ice mix in the storage container 3 under pressure in a sterile atmosphere. A check valve 26 at the end of the air tube 24 prevents a reverse flow of air from the storage container 3.

As indicated above, the lead-in tube 13 and the return tube 14 are connected at their distant end from the storage container 3 to a freezing and dispensing container 27 spacially separated from the storage container 3 and which, for example, may be located on the service counter of a restaurant. The front of the freezing container 27 is provided with a suitable spigot 29 of known design, for the dispensing of the prepared soft ice portions. The freezing container 27 comprises, primarily, a small supply chamber 29 and a freezing cylinder 30 located between the supply chamber 29 and the spigot 29 and constituting the major extent of the freezing and dispensing container 27.

The freezing cylinder 30 contains a mixing unit 31 comprising a spiral-shaped mixing element and at least one or several scraping blades 32 which move along the inner walls of the freezing cylinder 30. A spiral 33 for dispensing the finished ice cream is installed at the front end of the stirring or mixing unit 31, immediately behind the spigot 29. The spiral-shaped stirring element 34 serves mainly for transporting the soft ice mix toward the spigot and for beating air into the thawing and thawed soft ice mass. The supply chamber 29 and the freezing cylinder 30 are separated by a conventional dividing plate 35.

The lead-in and return tubes 13 and 14 open, respectively, at 42 and 43 in the supply zone 28 of the freezer and dispenser 27. Preferably, however, the lead-in tube 13, feeding the soft ice mix from the storage container 3, opens into the supply chamber 28 at a location higher than the return tube 42 so as to also guarantee a turning over of the ice mix in the freezing container 27.

The freezing cylinder 30 is surrounded by a suitable refrigerating coil 36 through which the refrigerating coolant is passed, control being effected by a cold thermostat 40. In addition, one of several heating rods 37 is arranged in the area of the freezing cylinder 40 for either heating the soft ice mix located in the freezing chamber to the pasteurizing temperature, if desired, or for cleaning the freezing container 27 with heated water. At any rate, it is desirable to provide scraper blades 32 along the interior wall of the freezing cylinder 30 to prevent sticking and scorching of the ice mix on such wall during any pasteurizing operation and, during normal operation, to prevent freezing of the soft ice mix on the freezing cylinder wall. It will be understood that a suitable insulating jacket 41 is provided about the entire freezer container 27 and that suitable regulating thermostats 38 and 39 are provided, respectively, to control the temperature of the jacket and the heating rods 37 during any heating operation. It will also be understood that a pulley 44, connected to the stirring apparatus 31, is provided for powering by a drive motor (not shown).

An air tube 25 is provided which branches off from the compressed air tube 24 and enters the upper area of the supply chamber 28, for feeding compressed air into the soft ice mix to the supply chamber 28. A suitable check valve 47 is provided at the end of the air tube 25 at the supply chamber 28 to prevent backfeeding of air through the tube 25.

It will be understood that the soft ice mix, used to prepare the soft ice dispensed from the spigot 29, is placed directly into the storage container 3. This is accomplished by providing the storage container 3 with a pressure-resistant and pressure-tight lid 45 which is, in turn, held in position by a suitable insulated outer lid 46. During periods of rapid usage the mix is chilled in the storage container 3 and is pumped through the lead-in tube 13 to the supply chamber 28 and then into the freezing chamber 30 from where it is dispensed.

During periods of low consumption in particular, although this mode of procedure may be used at all times, the mix is continuously recirculated from the supply chamber 28 back to the storage container 3 through the tube 14, it being understood that a greater quantity will pass through the tube 13 than through the tube 14 because of the quantity which is dispensed through the spigot 29. By this latter type of operation, even though very little material may be dispensed through the spigot 29, no mix is permitted to remain very long in the tube 13, be it insulated or not, where it might become unduly warm. It will also be understood that any time pasteurization is desired, the heating units may be turned on to effect purification of the contents of the entire system; similarly, heated cleaning liquid may be circulated through the system with the heating units in operation.

It will be understood that the device of the present invention can be used not only for the preparation and dispensing of soft ice, namely soft ice cream or frozen custard, sherbert or flavored ices, but also for the storage and dispensing of milk with or without the addition of aromatic substances or fruits. Simultaneous cooling of the milk and/or fruit drinks is also possible. Since the sale of milk-mixed drinks is continually increasing, the results and additional economically interesting possibility of use for the present device; this is especially true because of its hygienically and bacteriologically satisfactory working conditions.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the range of equivalence of the disclosed embodiment. It is to be understood that the phraseology or terminology employed herein is for the purpose of description and not of limitation.

What is claimed is:

1. A device for the preparation and dispensing of soft ice in individual portions, comprising:

a storage container means for receiving the soft ice mix;

cooling means including a cooling coil connected to said storage container means for cooling the soft ice mix stored therein;

a freezing and dispensing container means, located at any predetermined distance or spatial relationship with regard to said storage container means for receiving the soft ice mix from said storage container means and for freezing and dispensing the soft ice, said freezing and dispensing container means comprising a supply chamber and a freezing chamber;

a lead-in tube passing from the bottom of said storage container means to said supply chamber;

a return tube passing from said supply chamber to the top of said storage container means;

first pump means for at least periodically pumping the soft ice mix from said storage container means through said lead-in tube to said supply chamber;

second pump means for at least periodically pumping the soft ice mix from said supply chamber through said return tube to said storage container means;

first heating means connected to said freezing and dispensing container means for heating the contents thereof to a predetermined extent when desired;

second heating means connected to said storage container supply means for heating the contents thereof to a predetermined extent when desired; and compressed gas means for feeding compressed gas into the interior of both said storage container means and said freezing and dispensing container means.

2. A device in accordance with claim 1 wherein said lead-in tube and return tube are embedded in a housing of insulating material.

3. A device in accordance with claim 1 wherein said storage container means is located below the level of said freezing and dispensing container means.

4. A device in accordance with claim 1 wherein the function of said first and second heating means is to heat the contents of said freezing and dispensing container means and said storage container means to a temperature sifficient to pasteurize said contents.

* * * * *

UNITED STATES PATENT OFFICE
CERTIFICATE OF CORRECTION

Patent No. 3,811,494                    Dated  May 21, 1974

Inventor(s) Waldemar MENZEL

It is certified that error appears in the above-identified patent and that said Letters Patent are hereby corrected as shown below:

In the title page at line [30], under "Foreign Application Priority Data "2139917" should read --2139917.7--

Col. 3, line 59, delete "29" and insert --28--

Col. 3, line 60, delete "29" and insert --28--

Col. 4, line 5, delete "29" and insert--28--

Col. 4, line 20, delete "40" and insert --30--.

Signed and sealed this 1st day of October 1974.

(SEAL)
Attest:

McCOY M. GIBSON JR.          C. MARSHALL DANN
Attesting Officer            Commissioner of Patents